United States Patent [19]

Kendall et al.

[11] Patent Number: 5,022,444
[45] Date of Patent: Jun. 11, 1991

[54] APPARATUS FOR FILLING PREDETERMINED QUANTITIES OF MATERIAL INTO CONTAINERS

[75] Inventors: Thomas D. Kendall, 525 Wells Road, Bristol, Great Britain, BS14 9AL; Peter T. Baddet, Slough, Great Britain

[73] Assignees: Thomas D. Kendall; Margaret J. Kendall, both of England

[21] Appl. No.: 407,552

[22] Filed: Sep. 15, 1989

[30] Foreign Application Priority Data

Sep. 20, 1988 [GB] United Kingdom ............... 8822109

[51] Int. Cl.$^5$ .............................................. B65B 3/04
[52] U.S. Cl. ..................................... 141/248; 177/98; 222/77; 141/196; 141/83
[58] Field of Search ............... 141/83, 248, 236, 234, 141/231, 196, 93; 222/77, 330, 410, 52; 177/59.90, 93, 111, 112, 114, 98, 99

[56] References Cited

U.S. PATENT DOCUMENTS

| | | | |
|---|---|---|---|
| 686,851 | 11/1901 | Hoepner | 177/98 |
| 694,487 | 3/1902 | Lottridge | 177/98 |
| 736,663 | 8/1903 | Williams | 177/98 |
| 876,092 | 1/1908 | Reynolds | 177/98 |
| 885,841 | 4/1908 | Davis | 177/90 X |
| 1,010,308 | 11/1911 | Palmer | 177/98 |
| 1,014,444 | 1/1912 | Broussard | 177/98 X |
| 1,236,923 | 8/1917 | Gladitsch | 141/248 X |
| 2,699,891 | 1/1955 | Kellicott | 141/248 X |
| 3,521,426 | 7/1970 | Evins | 114/83 X |

FOREIGN PATENT DOCUMENTS

| | | | |
|---|---|---|---|
| 66036 | 9/1936 | Australia | 177/93 |
| 17957 | of 1900 | United Kingdom | 177/93 |
| 1370044 | 9/1974 | United Kingdom | . |
| 2157009 | 10/1985 | United Kingdom | . |

Primary Examiner—Ernest G. Cusick
Attorney, Agent, or Firm—Wall and Roehrig

[57] ABSTRACT

Apparatus for filling containers alternately with predetermined quantities of material has two container positions to be fed alternately and a material guide arrangement with alternative outlets that supply the material to containers at these two positions. A pair of container support frames are arranged side by side on the front pair of a main frame, and these support frames are mounted by pivot arms to the main frame in a parallelogram arrangement. Rearwardly of the main frame front part are counterweights or counterbalances supported on either upper or lower ones of the pivot arms. An upper part of each of the support frames has a mechanism that coacts with a cooperating mechanism on the material guide arrangement to change the position of a diverter plate when the container that is being filled overbalances the corresponding counterbalance and causes the associated support frame to descend. All of the cooperating parts to effect this are disposed within the vertical extent of the diverter plate, and all on one side of the main frame.

11 Claims, 5 Drawing Sheets

APPARATUS FOR FILLING PREDETERMINED QUANTITIES OF MATERIAL INTO CONTAINERS

This invention relates to apparatus for filling containers with predetermined quantities of material, particularly to apparatus for servicing two container positions alternately from a material guide arrangement having alternative outlets to containers at the two container positions, respectively, and means for guiding material first to one of said outlets until a container has received therefrom said predetermined quantity of material and then to the other of said outlets, and vice versa.

We hold two prior United Kingdom patents for such apparatus, No 1370044 and No 2157009, both of which disclose a swinging feed chute for feeding the alternative outlets, and a feed chute swinging mechanism employing long push rod actuators extending from container counterweighting provisions at or below supports for bases of containers to be filled. When the contents of a said container reach the predetermined quantity (mass), the corresponding counterweighting provision is overcome and the container support lowers as the related push rod actuator(s) lift to swing the feed chute. Our first patent relies on simple pivoted platform provisions supporting the containers to one side of pivot axes and with counterweight provisions at the other side of those pivot axes. Our second patent has frames each carrying a container support to one side and pivotted frame support extending to the other side to counterweighting provisions below the container supports. The second patent also discloses use of over-center weights associated with chute swinging provisions for assisting desired operation.

It is an object of this invention further to improve such container filling apparatus in various respects including switching of feeding between alternative outlets to container positions, container support provisions in themselves, and relationship of those support provisions to main framework to aid handling of the apparatus as a whole, as frequently desirable for movement from place to place, say using a fork-lift truck.

According to a first aspect of this invention, there is provided apparatus for filling containers with predetermined quantities of material, comprising two container positions to be fed alternately with said material, a material guide arrangement having alternative outlets to containers at the two container positions, respectively, and means for directing material first to one of said outlets and then the other of said outlets and vice versa in each case until a predetermined quantity of material has been delivered therethrough; characterised by a pair of container support frames disposed side-by-side at each of said container positions, the support frames being mounted on a main frame by pivotted arms that alternately raise and lower the support frames on the main frame at one side of pivots of said arms, the support frames having parts that operate the means for directing material alternately to said outlets, which parts so operate from said one side of said pivots. Preferably, said parts are located at positions within overall height of the material guide arrangement.

An immediate advantage arising from said frame parts being on the same side of said arm pivots as the frames themselves, compared with prior arrangements using push rods (usually long) on the other side of those pivots, i.e. the same side as counterweighting, is that there is no requirement for cross-over of the push rods, or further provisions, to secure correct operation of the frames and the guiding means. Also, of course, apparatus hereof requires only short push rods operated from said parts usually at or close to tops of the container support frames.

Preferably, for this aspect, apparatus of the kind concerned has its material guide arrangement include a pivotting diverter disposed between an upper material inlet and lower said outlets spaced to each side of the inlet's center line, which can also pass through the diverter's pivot axes.

According to a second aspect of this invention, apparatus of the kind concerned comprises a main frame and a pair of container support frames disposed side-by-side and movable up and down on the main frame, each said support frame having vertically spaced mounting provisions each located rearwardly of container accommodation and extending upwardly into a casing of the apparatus from below.

Lower mounting provisions of such support frames may comprise rearwardly and upwardly extending parts journaled to carriers extending (from pivots to the main frame) towards the support frames.

Upper mounting provisions of such support frames may comprise parts extending rearwardly and downwardly from upper parts of the support frames within an overhanging head part of the casing of the apparatus, the rearwardly and downwardly extending support frame parts each being journaled to carriers extending (from pivots to the main frame) towards the support frames.

It can be advantageous to have the lower and upper carriers rearwardly journaled to rigid interconnections, respectively, making parallelogram linkages with the carrier pivots to the main frame.

Rearward extensions of or from the carriers at the lower and/or upper mounting provisions beyond their pivots to the main frame may carry or have associated therewith suitable counterweighting provisions, preferably as a target weight for the lower rearward extensions and, as further adjustments to correct the desired quantity, at the upper rearward extensions.

Suitable counterweighting provisions include target and coarse/fine quantity (mass) setting means slidable along scale beams constituting said rearward extensions of or from the carriers, and/or weigh pans associated for target weight support purposes directly or indirectly with the carriers.

According to a third aspect of this invention apparatus of the kind concerned comprises a main frame and a pair of container support frames disposed side by side and movable up and down on the main frame, the main frame having a bottom part raised upon downwardly extending legs to be above container bottom support positions of the support frames.

The first aspect permits use of short connecting rods between the parts for operating the material guiding means and see-saw beam by which the swinging part of the material guiding means is operated, which see-saw beam can be short or shorter than the spacing between the support frames, further contributing to reduced mass and size of operating linkages, itself contributed to by a low mass diverter plate.

The second aspect can help avoid foreign particles entering the apparatus casing by entering the casing from below, and particularly where entries are protected by seals or gaskets, say of bellows or concertina type, preferably also applying to diverter plate shaft and any other entry/exit of the casing.

The third aspect contributes to ease of transporting of the apparatus where the frame legs give ample clearance for insertion of a fork-lift to engage the frame bottom.

Specific implementation of the various aspects of this invention will now be described by way of example with reference to the accompanying diagrammatic drawings, in which FIG. 1 is a front elevation of one embodiment of container loading apparatus;

Figure 1:
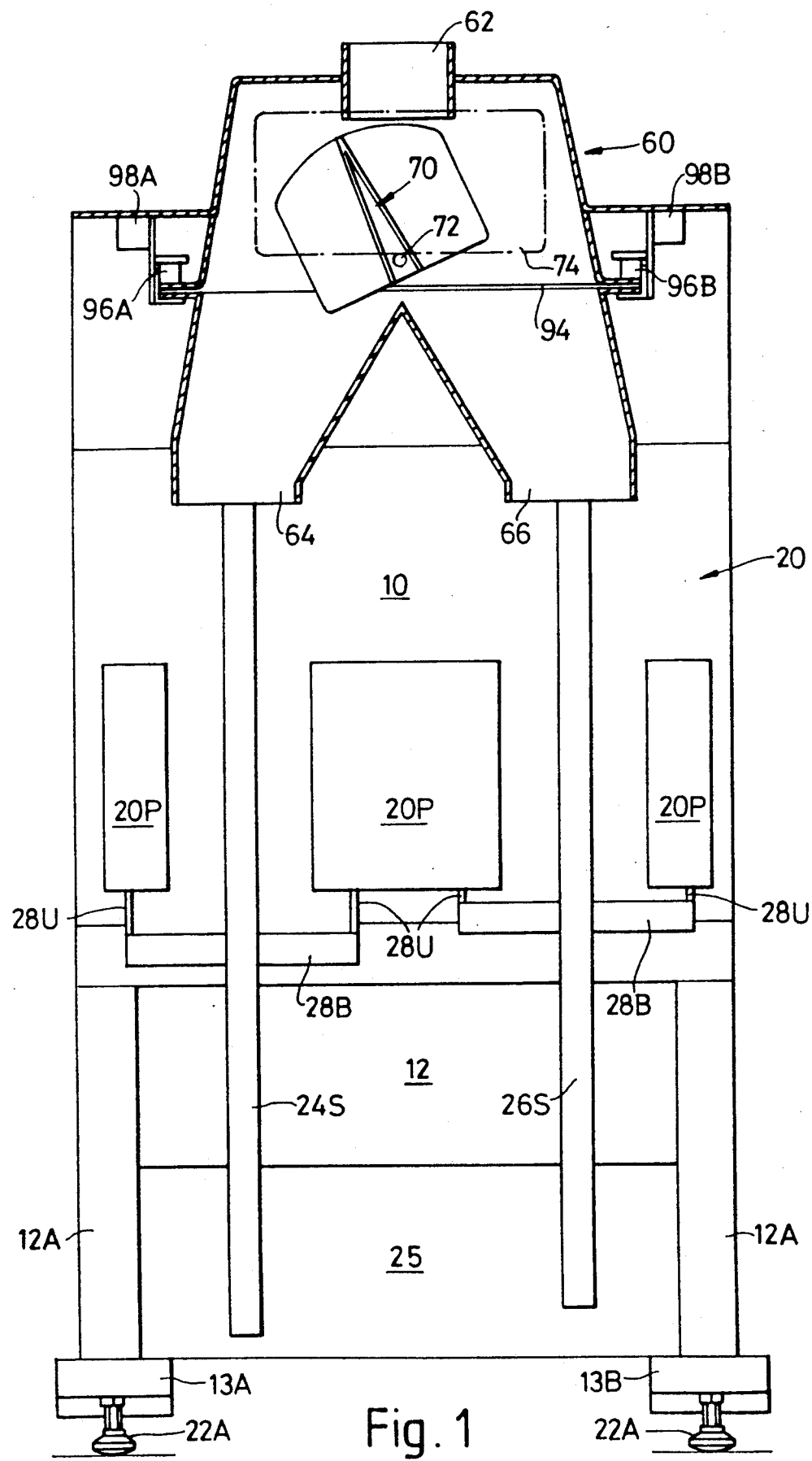

In the drawings, apparatus of the kind concerned comprises a main frame 10 having a base 12 with forward and rearward legs 12A and 12B, the forward legs 12a shown extending forwardly as well as downwardly to support beams 13A and 13B, and a bottom 14 supporting forward and rearward vertical subframes 16 and 18 (not shown in FIGS. 4a and 4B) within a casing 20. Adjustable feet 22A, B and rollers or wheels 23A, 23B are shown for the beams 13A, 13B.

A pair of container support frames 24, 26 are shown of basic T-configuration with stems 24S, 26S vertical in front of the main part 20M of the casing 20 and a shield plate 25 between the front legs 12A, and heads 24H, 26H within a forwardly overhanging head 20H of the casing 20. The stems 24S, 26S have spaced lower mounting provisions 28 extending at ends of horizontal bars 28B rearwardly at 28R and upwardly at 28U into protruding housing parts 20P by way of foreign particle excluding gaskets 28G. Free ends of the lower mounting parts 28 are journaled at pivots 30 to ends of carriers 32 extending from pivots 34 to the forward subframe 16. The heads 24H, 26H have upper mounting provisions 38 extending rearwardly at 38R and downwardly at 38D, and the stems 24S, 26S enter the overhung casing head 20H through foreign particle excluding gaskets 35. Free ends of the upper mounting parts 38 are journaled at 40 to ends of carriers 42 extending from pivots 44 to the forward subframe 16.

It will be appreciated that the container support frames 24,26 can move up and down on the main frame 10, specifically the forward vertical subframes 16, by virtue of the carriers 32, 42. Base or bottom etc supports for containers to be loaded can be affixed to the stems 24S, 26S and/or bars 24B, 26B in any convenient way.

Figure 3:
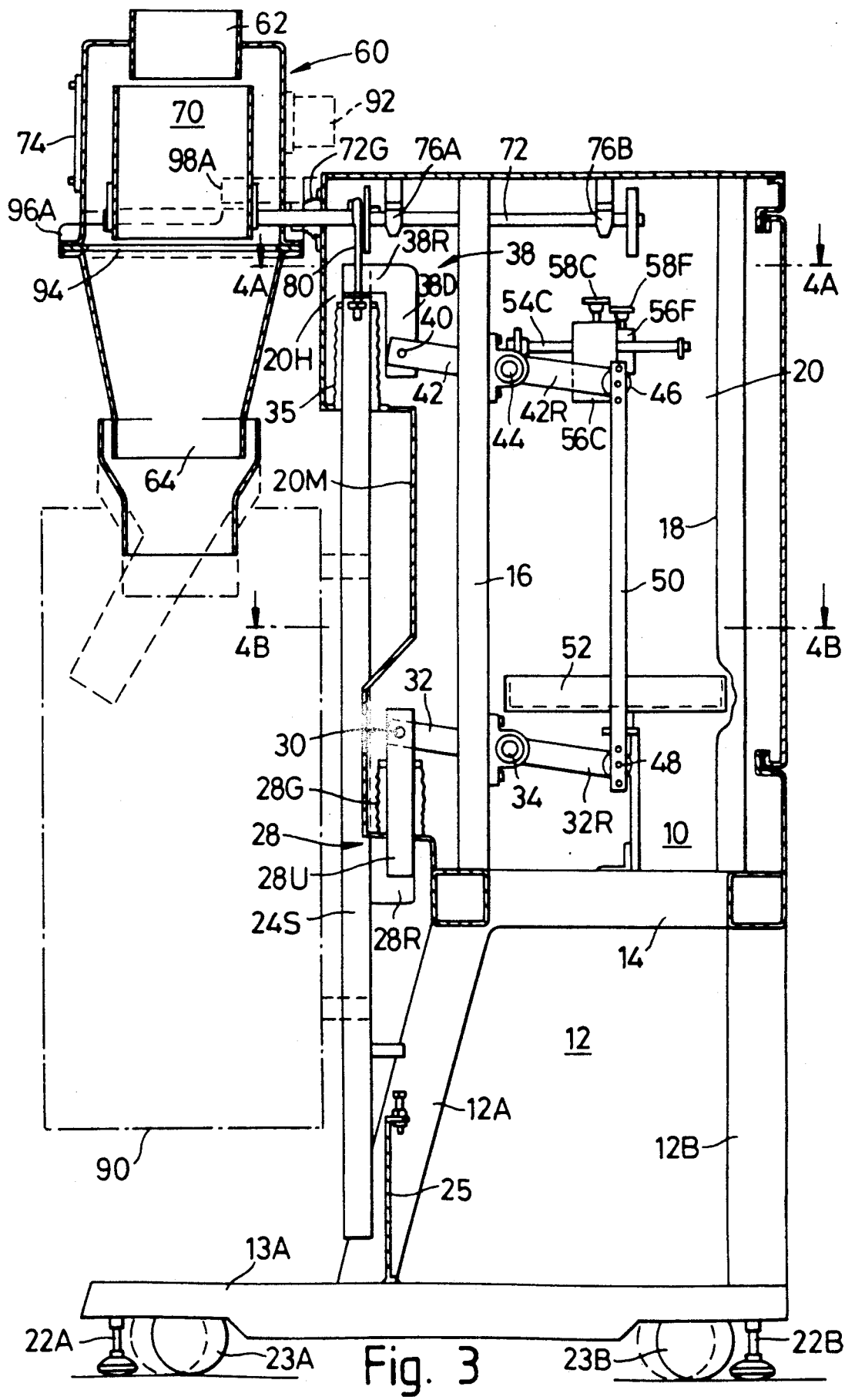
FIG. 3 is a vertical section from front to back showing main frame, support frame counterweighting and material supply.
Figure 4A:
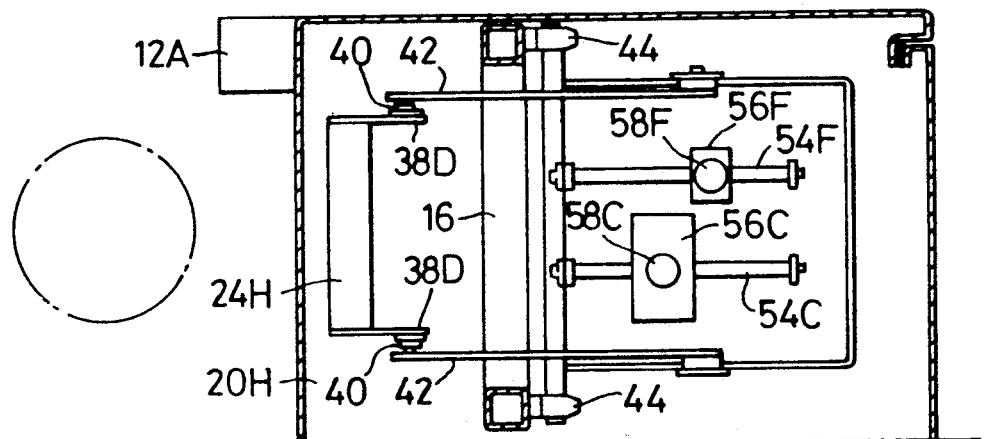
FIGS. 4A and 4B are outline part sections on lines A—A and B—B of FIG. 3.
Figure 4B:
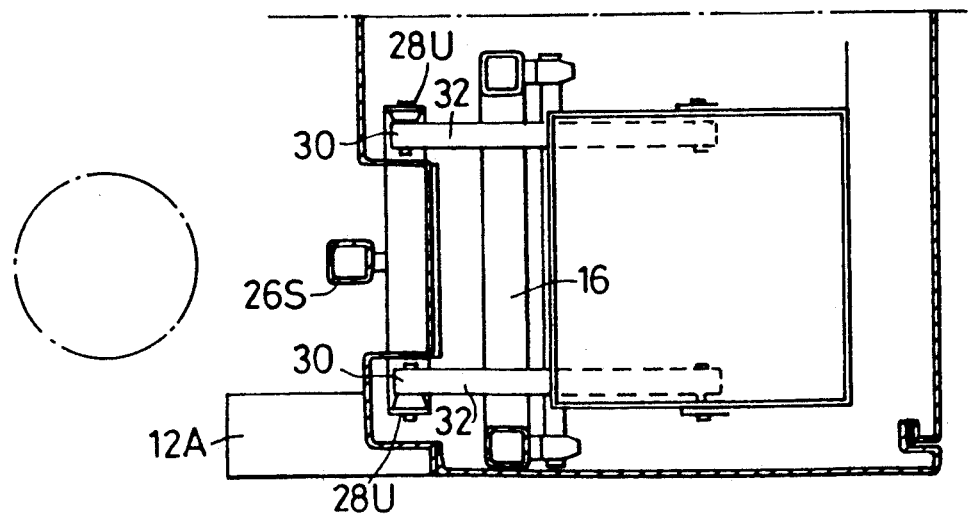

FIGS. 3, 4a, and 4B shows those carriers 32, 42 extended at 32R, 42R rearwardly of their pivots 34, 44 to free ends journaled at 46, 48 to a rigid frame 50 making a parallelogram linkage relative to the pivots 34, 44. Counterweighting is indicated as being by way of a lower weigh pan 52 secured to the frame 50 and upper coarse and fine scale beams 54C, 54F graduated and having slidable weights 56C, 56F and lockable means 58C, 58F therealong.

Figure 3A:
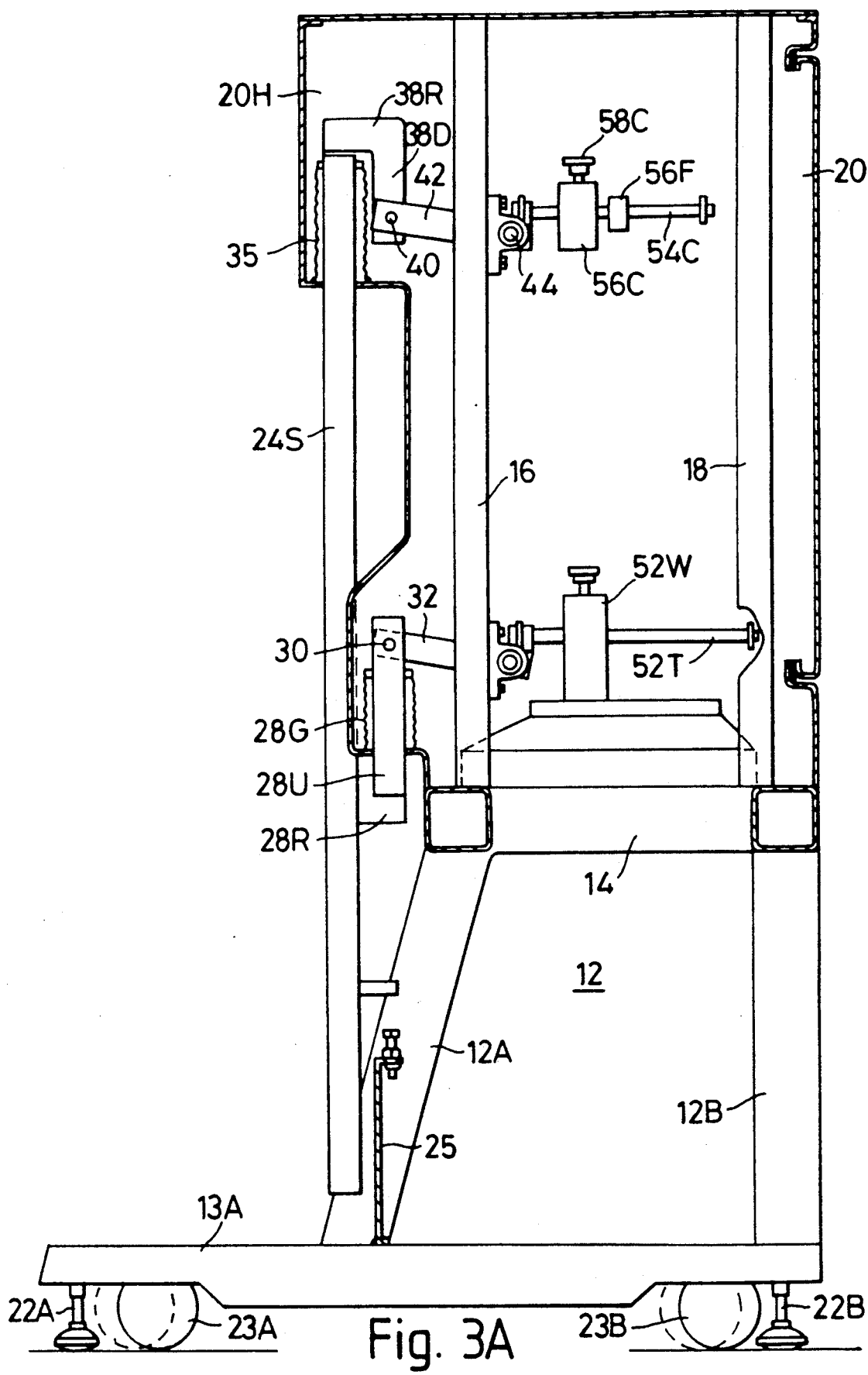
FIG. 3A is a detail view of a portion of a variant design of the structure shown in FIG. 3.

FIG. 3A shows a variant omitting the frame 50, weigh pan 52, and the rearward extensions 32R, 42R of the carriers 32, 42. Instead, there is a target weight scale beam 52T extending rearwardly of the carriers 32 with associated lockable target weight 52W.

Material can be fed to the apparatus can be in any convenient way, for example conveyors to a material guide arrangement 60 that has a single inlet 62 and alternative spaced outlets 64 and 66, one for each of container positions corresponding to the support frames 24 and 26, shown cent red on the stems 24S, 26S. The material guide arrangement 60 includes a diverter 70 keyed to a shaft 72 and capable of swinging according to rotation of that shaft 72 between positions in which it deflects material to one or the other of the outlets 64 and 66. The shaft 72 is on the center-line of the inlet 62 mid-way between center lines of the outlets 64, 66 and is of narrow upwardly tapering triangular section with the shaft 72 conveniently nearer its bottom than its top. The arrangement 60 conveniently has a removable and replaceable cover plate 74 for access to the diverter 70.

The shaft 72 is journaled at 76A, 76B to the main frame 10 where it extends horizontally rearwardly into the casing 20. Also keyed to the shaft 72 is a see-saw beam 80 shown in FIG. 2 of a length barely greater than the spacing between the support frames 24, 26. Connecting rods 82, 84 are journaled at 82B, 84B to ends of the see-saw beam 80 and slide in ends 86E, 88E of parts 86, 88 extending from heads 24H, 26H of the support frames 24, 26 and cooperating with stops 82S, 84S on the connecting rods 82, 84. FIG. 2A shows a variant with the see-saw beam 80' below the extending parts 86, 88' and all reference numerals are primed.

Figure 2:
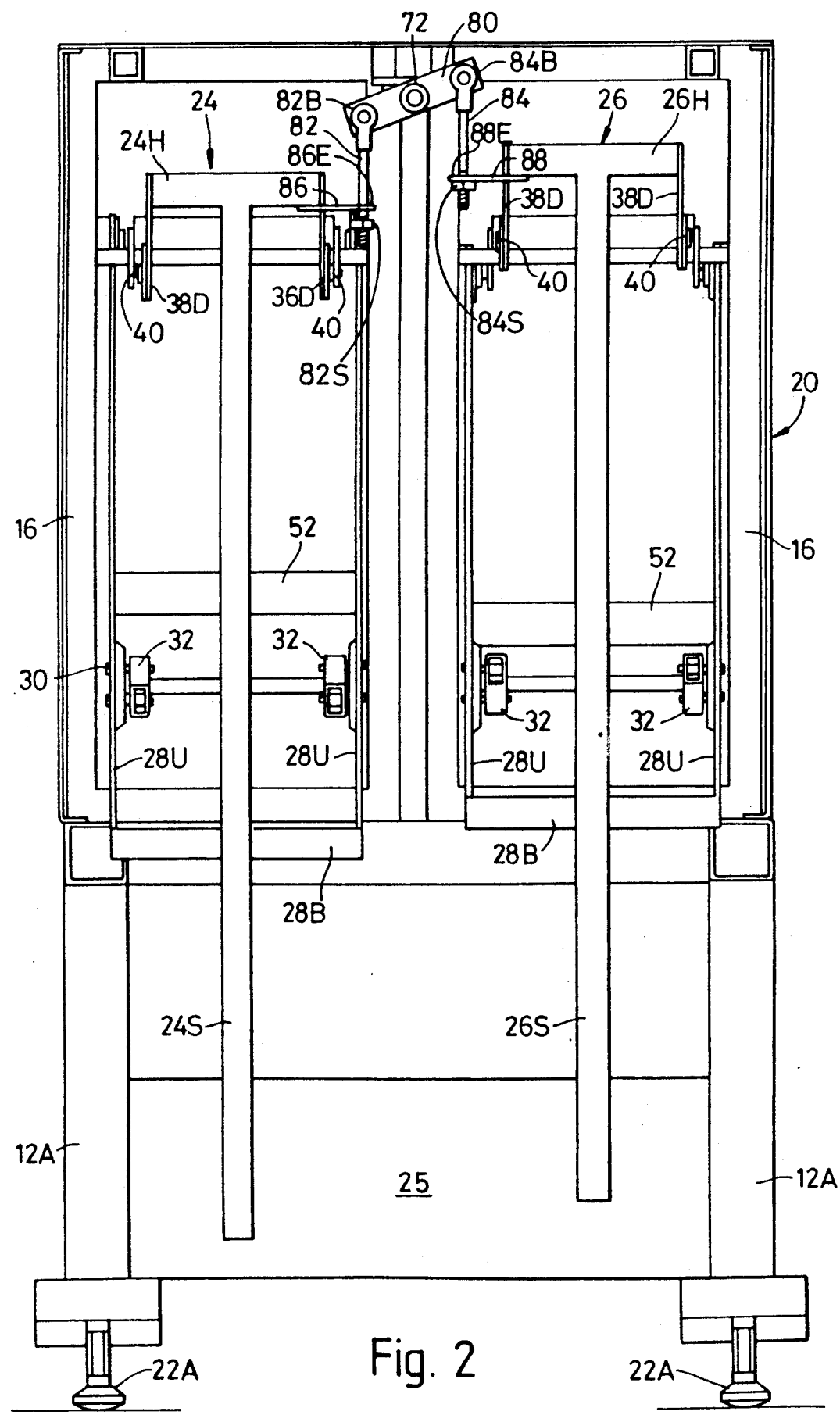
FIG. 2 is a similar view with front casing removed concentrating an alternating material guide provisions.
Figure 2A:
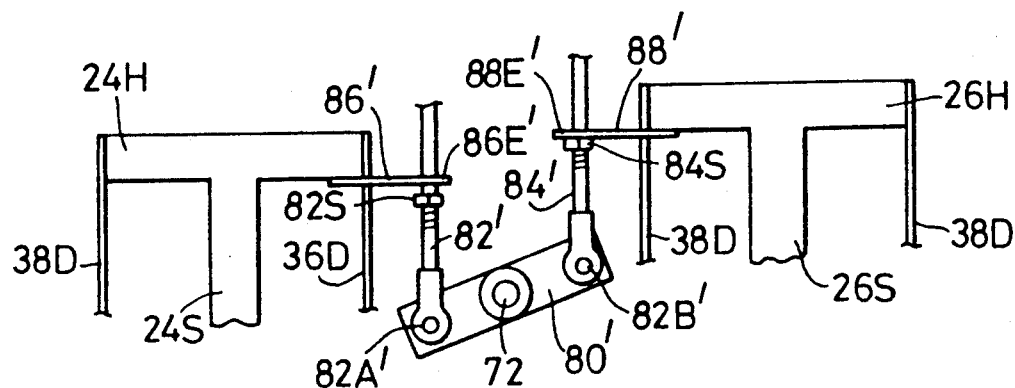
FIG. 2A is a detail view of a portion of a variant design of the structure shown in FIG. 2.

In operation, one of the support frames 24, 26 must be up and the other down, as seen in FIGS. 1 and 2. Containers on some suitable further supports, say sack bins 90 fastened onto the frames 24, 26, are filled alternately while the corresponding frame is up and until its contents overcome the counterweighting. Then, the frames 24,26 reverse and the diverter 80 swings to direct material flow into the other container, i.e. containers are automatically filled alternately and the operator merely has to replace filled containers with empty ones. Any desired feed aids can be fitted to the outlets 62 and 64, as shown in FIG. 3.

The gaskets 28G, 38G assure that the casing 70 is dust free inside, and a gasket 72G is also shown for sealing the shaft 72. Also, a dust extractor unit 92 may be fitted to the material guiding arrangement 60 itself shown removably held in an apertured frame 94 on spaced arms 96A, 96B fixed to containers 98A, B.

We claim:

1. Apparatus for filling containers with predetermined quantities of materials in which respective containers at two container support positions are fed alternately with said material, comprising:

a material guide arrangement including two alternative outlets to supply the material to the containers at the two said container support positions, and diverter means for directing the material first to one of said alternative outlets and then to the other of said outlets and vice versa, in each case until the respective predetermined quantity of material has been delivered therethrough;

a generally vertical main frame having a front frame portion;

a pair of container support frames each supported on said main frame and each extending generally vertically at a respective one of said container support positions, the two container support frames being disposed side by side forwardly of the front frame portion;

for each said container support frame respective upper and lower support arms pivotally mounted on said main frame front frame portion and pivotally joined to upper and lower positions on the respective support frame to form parallelogram linkages for said support frames, formed by the respective support frame, the main frame front frame portion, and the associated upper and lower support arms;

respective counterbalance means for each said support frame coupled to at least one of the upper and lower support arms associated therewith and disposed rearwardly of said main frame front frame portion, including means for adjusting the weight setting thereof, for raising the support frames until the counterbalance means are overbalanced by the weight of the material fed into the container at the container position associated with the respective support frame;

operative means at an upper end of each of said support frames acting upon associated means on said diverter means, said operative means and said associated means being disposed forwardly of said main frame front frame portion, for mechanically changing the position of said diverter means when the weight of the material in the container being filled at the one container support position overbalances the associated counterbalance means, and causes the respective support frame to move downwardly, thus commencing the feeding of said material into the container at the other said container support position.

2. Apparatus according to claim 1 wherein said material guide arrangement has an overall vertical extent, and said operative means and said associated means on said diverter means are positioned entirely within said overall vertical extent.

3. Apparatus according to claim 2 wherein said operative means consist of parts connected at upper ends of said support frames above said container support positions, and said associated means include push rods connected to said diverter means and which are displaced by movement of said parts to redirect flow of said material from one said outlet to the other.

4. Apparatus according to claim 1 wherein said diverter means includes a diverter pivotally mounted about a pivot axis in said material arrangement between a material inlet above said diverter and said material outlets positioned below said diverter and spaced on opposite sides of a vertical line passing through the pivot axis of the diverter.

5. Apparatus according to claim 1 wherein each of said support frames includes upper and lower vertical members disposed rearwardly of said container support positions, and pivotally mounted on said pivot support arms.

6. Apparatus according to claim 5 further comprising a casing enclosing said main frame, and said upper and lower vertical mounting members penetrate through respective openings in said casing.

7. Apparatus according to claim 6 wherein the lower vertical mounting member has a rearwardly extending portion connected to an upwardly extending portion that is pivotally journalled to the associated lower support arm.

8. Apparatus according to claim 7 wherein said casing includes an overhanging head portion, and the upper vertical mounting members have a rearwardly extending part joined to said support frame and a downwardly extending part journalled to the associated upper support arms, and wherein the upper vertical mounting members are disposed with the overhanging head portion of said casing.

9. Apparatus according to claim 8 further comprising foreign particle excluding means disposed at said openings in the casing through which the upper and lower vertical mounting members penetrate.

10. Apparatus according to claim 6 further comprising a vertical rigid connecting member pivotally journalled to associated ones of the upper and lower support arms rearwardly of the main frame front frame member to form a parallelogram linkage with said support arms and said front frame member.

11. Apparatus according to claim 1 wherein said main frame includes a bottom frame member having support legs extending downwardly therefrom, and wherein said bottom frame member is supported at a level above the container support positions.

* * * * *